(12) United States Patent
Kodama et al.

(10) Patent No.: US 7,440,624 B2
(45) Date of Patent: Oct. 21, 2008

(54) IMAGE COMPRESSION APPARATUS, IMAGE DECOMPRESSION APPARATUS, IMAGE COMPRESSION METHOD, IMAGE DECOMPRESSION METHOD, PROGRAM, AND RECORDING MEDIUM

(75) Inventors: Taku Kodama, Kanagawa (JP); Keiichi Suzuki, Tokyo (JP); Takashi Maki, Kanagawa (JP); Ikuko Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 827 days.

(21) Appl. No.: 10/781,224

(22) Filed: Feb. 17, 2004

(65) Prior Publication Data
US 2004/0213472 A1 Oct. 28, 2004

(30) Foreign Application Priority Data
Feb. 17, 2003 (JP) ............................. 2003-037972

(51) Int. Cl.
*G06K 9/36* (2006.01)
(52) U.S. Cl. ...................... 382/232; 382/233
(58) Field of Classification Search ................ 382/232, 382/233, 299; 341/50, 51, 106, 107; 348/581; 358/434; 711/170; 704/220, 212, 265
See application file for complete search history.

(56) References Cited

U.S. PATENT DOCUMENTS

| | | | | | |
|---|---|---|---|---|---|
| 5,365,602 | A | * | 11/1994 | Levien | 382/299 |
| 5,663,721 | A | * | 9/1997 | Rossi | 341/51 |
| 5,839,100 | A | * | 11/1998 | Wegener | 704/220 |
| 6,359,548 | B1 | * | 3/2002 | Cooper | 341/50 |
| 7,129,860 | B2 | * | 10/2006 | Alvarez et al. | 341/51 |

FOREIGN PATENT DOCUMENTS

| | | |
|---|---|---|
| JP | 2000-134623 | 5/2000 |
| JP | 2001-285645 | 10/2001 |
| JP | 2002-165098 | 6/2002 |
| JP | 2002-247580 | 8/2002 |
| JP | 2002-315000 | 10/2002 |
| JP | 2002-344913 | 11/2002 |
| JP | 2003-037740 | 2/2003 |
| JP | 2002-315000 | 10/2007 |

* cited by examiner

*Primary Examiner*—Anh Hong Do
(74) *Attorney, Agent, or Firm*—Blakely, Sokoloff, Taylor & Zafman LLP

(57) ABSTRACT

An image compression apparatus includes a code size setting unit setting one or more code sizes, a compressing unit compressing an image that is divided into plural image quality levels in accordance with the code sizes, and a code generating unit generating code being dividable into each code size.

15 Claims, 15 Drawing Sheets

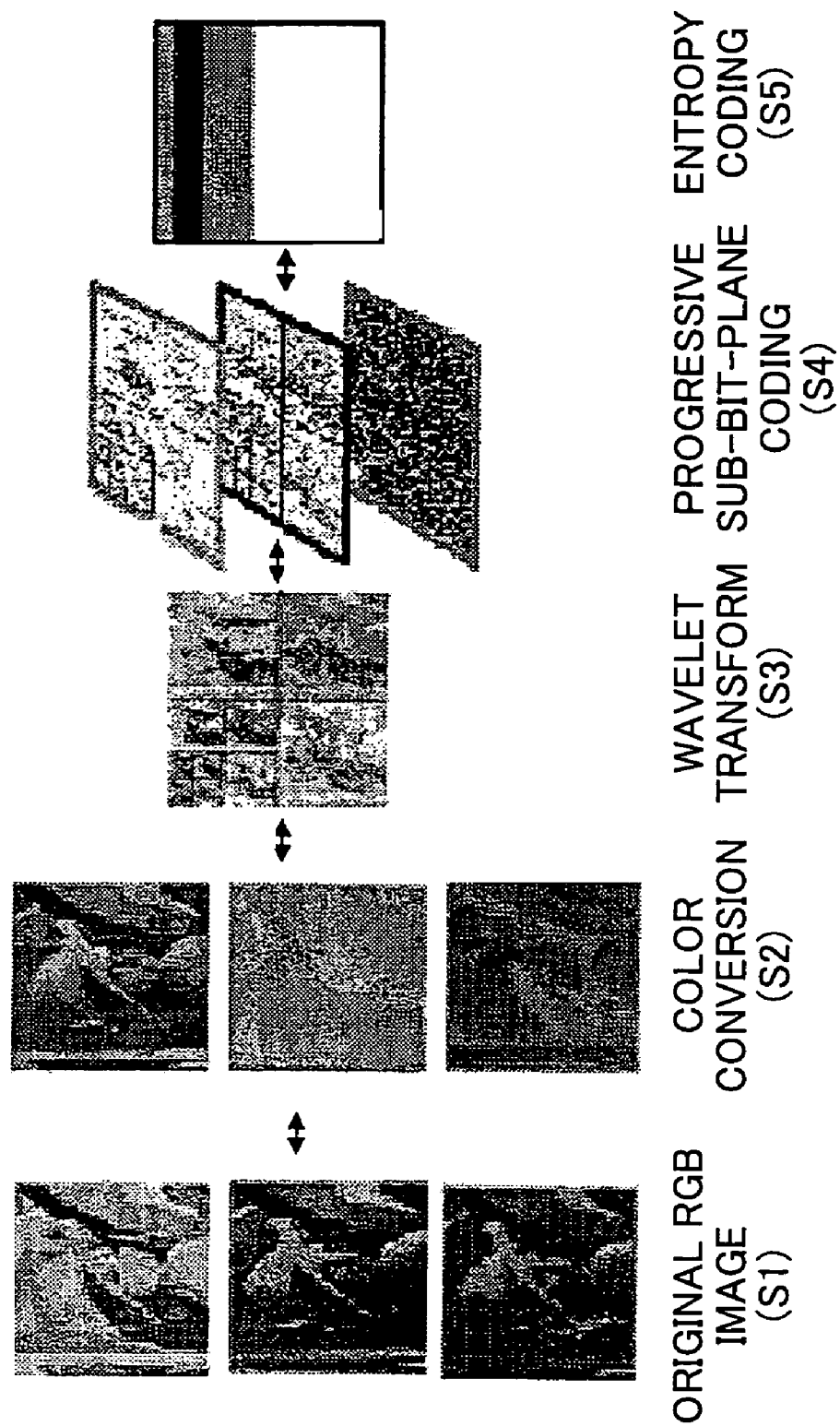

DECOMPOSITION_LEVEL_0

DECOMPOSITION_LEVEL_1

DECOMPOSITION_LEVEL_2

DECOMPOSITION_LEVEL_3

FIG.6

| SUB-BAND | 2LL | 2HL | 2LH | 2HH | 1HL | 1LH | 1HH |
|---|---|---|---|---|---|---|---|
| PRECINCT No. | 0 1 2 3 | 0 1 2 3 | 0 1 2 3 | 0 1 2 3 | 0 1 2 3 4 5 6 7 | 0 1 2 3 4 5 6 7 | 0 1 2 3 4 5 6 7 8 |

| | | | | | | | | | | |
|---|---|---|---|---|---|---|---|---|---|---|
| | | | | | | | | | | 51 | 72 | 93 | 114 | 135 | 156 | 177 | 198 | 215 | 228 |

(Bit plane table from MSB to LSB with Significant / Refinement / Cleanup sub-bit planes for Code of Bit 12 … Code of Bit 1)

Values by precinct row:

| Row | Values |
|---|---|
| 51 | 72 93 114 135 156 177 198 215 228 |
| 50 | 71 92 113 134 155 176 197 214 227 |
| 49 | 70 91 112 133 154 175 196 213 226 |
| 48 | 69 90 111 132 153 174 195 212 225 |
| 47 | 68 89 110 131 152 173 194 211 224 |
| 46 | 67 88 109 130 151 172 193 210 223 |
| 45 | 66 87 108 129 150 171 192 209 222 |
| 44 | 65 86 107 128 149 170 191 208 221 |
| 43 | 64 85 106 127 148 169 190 207 220 |
| 42 | 72 93 114 135 156 177 198 215 228 |
| 41 | 71 92 113 134 155 176 197 214 227 |
| 40 | 70 91 112 133 154 175 196 213 226 |
| 39 | 69 90 111 132 153 174 195 212 225 |
| 38 | 68 89 110 131 152 173 194 211 224 |
| 37 | 67 88 109 130 151 172 193 210 223 |
| 36 | 66 87 108 129 150 171 192 209 222 |
| 35 | 65 86 107 128 149 170 191 208 221 |
| 34 | 64 85 106 127 148 169 190 207 220 |
| 33 | 72 93 114 135 156 177 198 215 228 |
| 32 | 71 92 113 134 155 176 197 214 227 |
| 31 | 70 91 112 133 154 175 196 213 226 |
| 30 | 69 90 111 132 153 174 195 212 225 |
| 29 | 68 89 110 131 152 173 194 211 224 |
| 28 | 67 88 109 130 151 172 193 210 223 |
| 27 | 66 87 108 129 150 171 192 209 222 |
| 26 | 65 86 107 128 149 170 191 208 221 |
| 25 | 64 85 106 127 148 169 190 207 220 |
| 7 | 15 63 84 105 126 147 168 189 206 219 |
| 6 | 14 62 83 104 125 146 167 188 205 218 |
| 5 | 13 61 82 103 124 145 166 187 204 217 |
| 4 | 12 60 81 102 123 144 165 186 203 216 |
| 7 | 15 23 59 80 101 122 143 164 185 202 |
| 6 | 14 22 58 79 100 121 142 163 184 201 |
| 5 | 13 21 57 78 99 120 141 162 183 200 |
| 4 | 12 20 56 77 98 119 140 161 182 199 |
| 7 | 15 63 59 80 101 122 143 164 185 202 |
| 6 | 14 62 58 79 100 121 142 163 184 201 |
| 5 | 13 61 57 78 99 120 141 162 183 200 |
| 4 | 12 20 56 77 98 119 140 161 182 190 |
| 3 | 11 19 27 55 76 97 118 139 160 181 |
| 2 | 10 18 26 54 75 96 117 138 159 180 |
| 1 | 9 17 25 53 74 95 116 137 158 179 |
| 0 | 8 16 24 52 73 94 15 136 157 178 |

BIT PLANE: MSB — Code Of Bit 12, Code Of Bit 11, Code Of Bit 10, Code Of Bit 9, Code Of Bit 8, Code Of Bit 7, Code Of Bit 6, Code Of Bit 5, Code Of Bit 4, Code Of Bit 3, Code Of Bit 2, Code Of Bit 1 — LSB SUB-BIT PLANE: Significant / Refinement / Cleanup

FIG.7

| SUB-BAND | 2LL | 2HL | 2LH | 2HH | 1HL | 1LH | 1HH |
|---|---|---|---|---|---|---|---|
| PRECINCT No. | 0 1 2 3 | 0 1 2 3 | 0 1 2 3 | 0 1 2 3 | 0 1 2 3 4 5 6 7 8 | 0 1 2 3 4 5 6 7 8 | 0 1 2 3 4 5 6 7 8 |

(table of bit-plane/sub-bit-plane coded values, rows labeled from MSB Code Of Bit 12 down to LSB Code Of Bit 1, with Cleanup / Significant / Refinement / Cleanup sub-bit-planes)

Legend:
- THUMBNAIL FOR DIGITAL CAMERA
- THUMBNAIL FOR IMAGE VIEWER SOFTWARE
- THUMBNAIL FOR MOBILE PHONE

LAYER 0 – LAYER 9

FIG.8

| CAPACITY OF TRANSMISSION LINE (bps) | IMAGE QUALITY LEVEL |
|---|---|
| 1G | LAYER 0 |
| 100M | LAYER 2 |
| 10M | LAYER 4 |
| 8M | LAYER 5 |
| 1M | LAYER 7 |
| 5.6K | LAYER 10 |

IMAGE COMPRESSION APPARATUS, IMAGE DECOMPRESSION APPARATUS, IMAGE COMPRESSION METHOD, IMAGE DECOMPRESSION METHOD, PROGRAM, AND RECORDING MEDIUM

CLAIM OF PRIORITY

The present application claims priority to the corresponding Japanese Application No. 2003-037972, filed on Feb. 17, 2003, the entire contents of which are hereby incorporated by reference.

BACKGROUND OF THE INVENTION

1. Field of the Invention

The present invention relates to an image compression apparatus, an image decompression apparatus, an image compression/decompression apparatus, an image compression method, an image decompression method, an image compression/decompression method, a program, and a recording medium.

2. Description of the Related Art

In recent years and continuing, there is considerable spread in the use of images with high quality. This is largely due to input devices (e.g., digital still cameras, scanners) and output devices (e.g., inkjet printers, displays) serving to handle high quality images. Among algorithms handling still images of high quality, JPEG (Joint Photographic Experts Group) is, at present, most widely used. In eliminating the redundancy of spatial areas, JPEG employs a two-dimensional discrete cosine transform.

A basic function of this transform type is merely to compress and decompress still images. The JPEG type is neither able to manipulate images in a compressed state or view a particular area during decompression. In addition, the JPEG type handles an image as a flat structure that has no hierarchy. Accordingly, encoded data must be completely decoded in order to perform a new process on an image.

With the JPEG algorithm, as an image is provided with a higher fineness or larger scale, that is, as the number of pixels of an original image increases, the time required for decompressing the encoded image and displaying the image on a display device will also increase. Such increase has reached a level that it can no longer be ignored owing to the fact that fineness and area of an original have increased due to the improvements in the performance of recent input devices. It is also a concern for areas related to handling of satellite/aerial photographs or medical/scientific images, and areas related to recording images of cultural assets. It is to be noted that the time required in decompressing a JPEG compressed image has a characteristic of being a certain value having no relation to the compression ratio. This is due to the fact that JPEG compressed data must be completely decoded regardless of compression ratio.

Generally, displaying all pixels of a large image is difficult in that there is a restriction on the number of pixels that can be displayed on a display device. This is, therefore, actually dealt with by reducing the image on the display. Nevertheless, even in displaying a reduced image with a conventional JPEG algorithm, it is required to obtain every pixel value by decompressing the entire original image, and then conduct a pixel skipping process. The decompression time for obtaining every pixel value of the original image increases in proportion to the number of pixels of the image. Although the time may also depend on the performance of the CPU or the capacity of the memory, it takes, for example, several minutes to several tens of minutes until the image is displayed.

With the conventional JPEG algorithm, even in a case where sufficient information can be obtained without conducting a complete decoding process, such complete decoding process is necessary, and it is impossible to designate an image area targeted for decompression or an order (sequence) for performing decompression in a decompression process. The conventional JPEG algorithm has difficulty in meeting the needs such as displaying a color image with a gray scale image, viewing only a certain area of an image, viewing an image in a thumbnail size, accessing image contents at high speed, or viewing a fast forward display of a motion image. With the JPEG algorithm, first, image data are generated by performing a complete decompression process on encoded data of an original image. Then, a desired image is obtained by transforming the generated image data into, for example, image data for gray-scale display, image data for display of a particular area, or image data for thumbnail display.

Meanwhile, images are often displayed in thumbnail form by image display apparatuses. As for conventional techniques of displaying in thumbnail form, there are, for example, a method of decompressing an entire image and setting an appropriate resolution for the image, or a method of separately storing a thumbnail image. In any of such techniques, compression/decompression of an image is conducted by using basic functions of the JPEG standard or in some cases expanded functions. It is to be noted that a thumbnail image is an image that is output (e.g. displayed, printed, and/or transmitted) in a condensed form of a desired code size.

Nevertheless, a large amount of time is required for outputting (e.g. displaying, printing, and/or transmitting) a thumbnail image in a case of employing a thumbnail outputting method conducted by decompressing an entire image and setting a suitable resolution for the image.

In a case of employing a thumbnail outputting method conducted by separately storing a thumbnail image, data of a thumbnail image (small-sized image) itself are generally stored in a header portion of compressed data of a main image, as with, for example, Exif (Exchangeable image file format). Although this method is able to increase output speed, this method requires large storage capacity for compressed data.

SUMMARY OF THE INVENTION

An image compression apparatus, image decompression apparatus, image compression method, image decompression method, program, and recording medium are described. In one embodiment, the image compression apparatus comprises: a code size setting unit setting one or more code sizes; a compressing unit compressing an image that is divided into a plurality of image quality levels in accordance with the code sizes; and a code generating unit generating code being dividable into each code size.

BRIEF DESCRIPTION OF THE DRAWINGS

FIG. 2 is a sequence of diagrams for illustrating an algorithm of a JPEG 2000 scheme;

FIG. 6 is a table showing an example of packets and layers in a case where the number of the decomposition levels is 2 (resolution level=3), in which an example of a typical layer structure is illustrated;

FIG. 7 is a table showing an example of packets and layers in a case where the number of the decomposition levels is 2 (resolution level=3), in which an example of a layer structure being able to output thumbnails according to respective apparatuses is illustrated;

FIG. 8 is a table showing an example of packets and layers in a case where the number of the decomposition levels is 2 (resolution level=3), in which an example of a layer structure being able to output thumbnails according to the capacity of a transmission line is illustrated;

DESCRIPTION OF THE PREFERRED EMBODIMENTS

Figure 1:
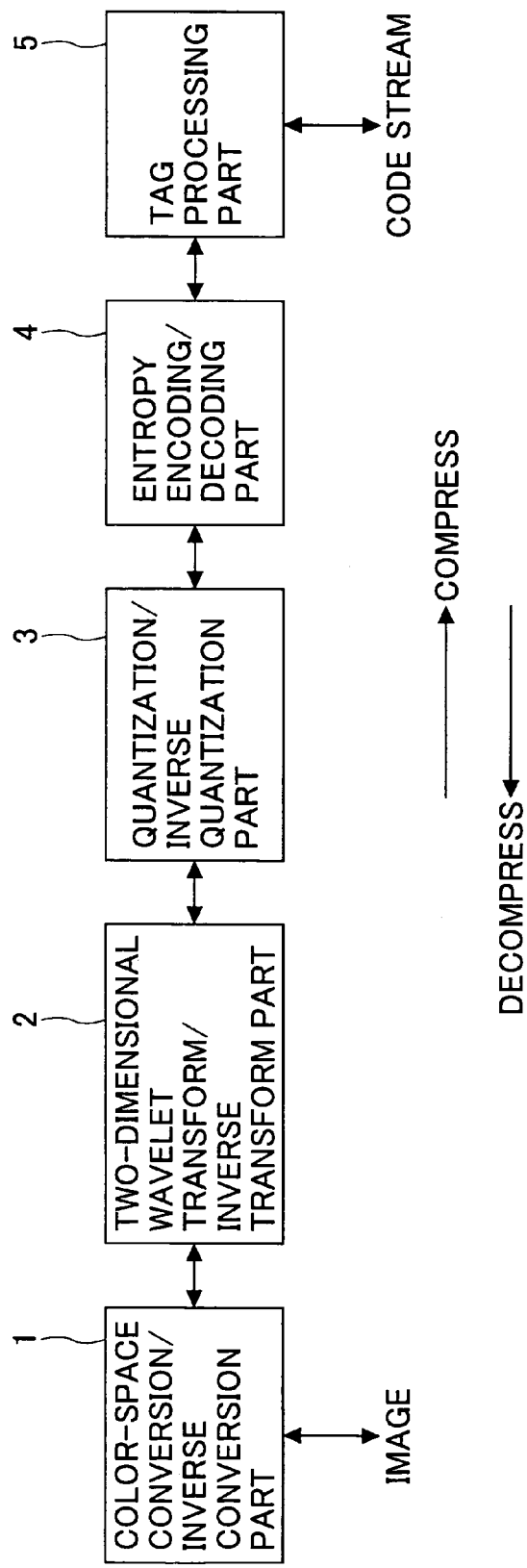
FIG. 1 is a block diagram for illustrating the hierarchical encoding/decoding algorithm serving as a base of a JPEG 2000 scheme.
Figure 3A:
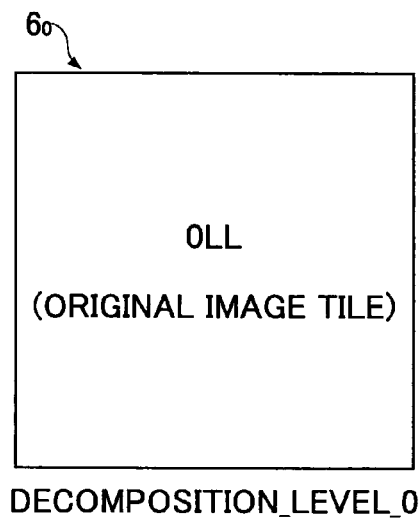
FIGS. 3A through 3D is a set of schematic diagrams showing sub-bands for each decomposition level in a case where the number of the decomposition levels is 3.
Figure 3B:
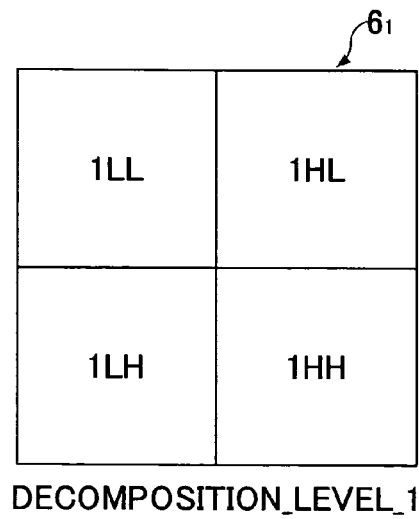
Figure 3C:
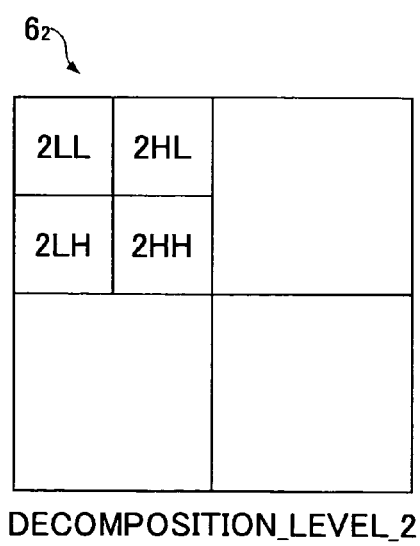
Figure 3D:
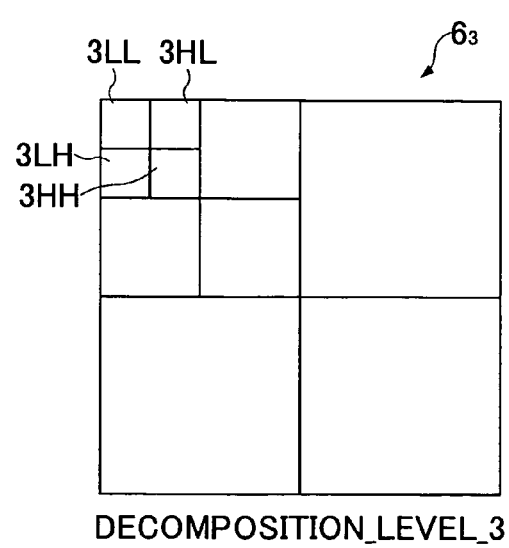

In order to solve the difficulties described above, the applicant of the present application proposes herein embodiments of present inventions related to a code stream forming apparatus, an image decompression system using such apparatus, an image decompression apparatus, an image providing system, a code stream forming method, an image decompression method, a computer readable program, and a computer readable recording medium having such program recorded thereto that can reduce the decompression time required for displaying compressed data, that is, a code stream forming apparatus, an image decompression system using such an apparatus, an image decompression apparatus, an image providing system, a code stream forming method, an image decompression method, a computer readable program, and a computer readable recording medium having such program recorded thereto, which serve to provide a code stream of still images that allows data of very fine images, having been encoded as still images or a moving image formed of a sequence of still images, to be displayed at high speed and in a size-reduced manner. The code stream forming function of the aforementioned inventions enables efficient image decompression by designating an area targeted for decompression or the order of conducting a decompression process. That is, such function allows a decompression procedure to be specified.

The aforementioned technologies proposed by the inventor of the present invention are examples that are applied with the expanded functions.

One or more embodiments of the present invention include an image compression apparatus, an image compression method, a program, and a recording medium that substantially obviate one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Embodiments as well as other features and advantages of the present invention will be realized and attained by an image compression apparatus, an image compression method, a program, and a recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the invention includes an image compression apparatus, having: a code size setting unit setting one or more code sizes; a compressing unit compressing an image that is divided into a plurality of image quality levels in accordance with the code sizes; and a code generating unit generating code being dividable into each code size.

According to the image compression apparatus in an embodiment of the present invention, the image quality level may be a layer.

According to the image compression apparatus in an embodiment of the present invention, the image compression apparatus may further include: a reference value setting unit setting a reference value corresponding to each code size.

According to the image compression apparatus in an embodiment of the present invention, the reference value may be the type of a transmission line.

According to the image compression apparatus in an embodiment of the present invention, the reference value may be the capacity of a transmission line.

According to the image compression apparatus in an embodiment of the present invention, the reference value may be the type of an image display apparatus.

According to the image compression apparatus in an embodiment of the present invention, the reference value may be display resolution.

According to the image compression apparatus in an embodiment of the present invention, the reference value may be the processing speed of an image display apparatus.

According to the image compression apparatus in an embodiment of the present invention, the image compression apparatus may further include: an embedding unit embedding the corresponding relation between the reference value and the code size into the generated code.

Furthermore, one embodiment of the present invention includes an image compression apparatus including: a dividing unit dividing image data into a plurality of segments; a code size setting unit setting a code size corresponding to each segment; a compression unit compressing the image data by adjusting the segments in accordance with the code size; and a code generating unit generating code by referring to the corresponding relation between the code size and the segments.

According to the image compression apparatus in an embodiment of the present invention, the dividing unit may include a unit that divides the image data based on a tile, a precinct, or a code block.

According to the image compression apparatus in an embodiment of the present invention, the segments may be color components.

According to the image compression apparatus in an embodiment of the present invention, the segments may be resolutions.

According to the image compression apparatus in an embodiment of the present invention, the segments may be packets.

According to the image compression apparatus in an embodiment of the present invention, the image compression apparatus may further include: an embedding unit embedding the corresponding relation between the code size and the segment into the generated code.

Furthermore, the present invention provides an image decompression apparatus including: a decompression unit decompressing the code generated from the image compression in an embodiment of the present invention.

According to the image decompression apparatus in an embodiment of the present invention, the decompression unit may decompress the code by referring to the corresponding relation between the code size and the reference value.

Furthermore, one embodiment of the present invention includes an image compression/decompression apparatus including: an image compression apparatus having a code size setting unit setting one or more code sizes, a compressing unit compressing an image that is divided into a plurality of image quality levels in accordance with the code sizes, and a code generating unit generating code being dividable into each code size; and a decompression unit decompressing the code generated in the code generating unit of the image compression apparatus.

Furthermore, one embodiment of the present invention includes an image compression/decompression apparatus having: an image compression apparatus having, a dividing unit dividing image data into a plurality of segments, a code size setting unit setting a code size corresponding to each segment, a compression unit compressing the image data by adjusting the segments in accordance with the code size, and a code generating unit generating code by referring to the corresponding relation between the code size and the segments; and a decompression unit decompressing the code generated in the code generating unit of the image compression apparatus.

Furthermore, one embodiment of the present invention provides an image compression method including: a) setting one or more code sizes; b) compressing an image that is divided into a plurality of image quality levels in accordance with the code sizes; and c) generating code being dividable into each code size.

According to the image compression method in an embodiment of the present invention, the image compression method may further include: d) setting a reference value corresponding to the code size.

According to the image compression method in an embodiment of the present invention, the reference value may be the type of a transmission line.

According to the image compression method in an embodiment of the present invention, the reference value may be the capacity of a transmission line.

According to the image compression method in an embodiment of the present invention, the reference value may be the type of an image display apparatus.

According to the image compression method in an embodiment of the present invention, the reference value may be display resolution.

According to the image compression method in an embodiment of the present invention, the reference value may be the process speed of an image display apparatus.

According to the image compression method in an embodiment of the present invention, the image compression method may further include: e) embedding the corresponding relation between the reference value and the code size into the generated code.

Furthermore, one embodiment of the present invention includes an image compression method including: a) dividing image data into a plurality of segments; b) setting a code size corresponding to each of the segments; c) compressing the segments of the image data by adjusting the segments in accordance with the code size; and d) generating code by referring to the corresponding relation between the code size and the segment.

According to the image compression method in an embodiment of the present invention, the image compression method, operation a) may further include a step of dividing the image data based on a tile, a precinct, or a code block.

According to the image compression method in an embodiment of the present invention, the segments may be color components.

According to the image compression method in an embodiment of the present invention, the segments may be resolutions.

According to the image compression method in an embodiment of the present invention, the segments may be packets.

According to the image compression method in an embodiment of the present invention, the image compression method may further include: e) embedding the corresponding relation between the code size and the segment into the generated code.

Furthermore, the present invention includes an image decompression method including: a) decompressing the code generated from the image compression method in an embodiment of the present invention.

According to the image decompression method in an embodiment of the present invention, the code may be decompressed by referring to the corresponding relation between the code size and the reference value.

According to the image decompression method in an embodiment of the present invention, the code may be decompressed by referring to the corresponding relation between the code size and the segment.

Furthermore, one embodiment of the present invention includes an image compression/decompression method including: a) setting one or more code sizes; b) compressing an image that is divided into a plurality of image quality levels in accordance with the code sizes; c) generating code being dividable into each code size; and d) decompressing the generated code.

Furthermore, one embodiment of the present invention includes an image compression/decompression method including: a) dividing image data into a plurality of segments; b) setting a code size corresponding to each of the segments; c) compressing the segments of the image data by adjusting the segments in accordance with the code size; d) generating code by referring to the corresponding relation between the code size and the segment; and e) decompressing the generated code.

Furthermore, one embodiment of the present invention includes recordable media storing a program to be installed or executed by a computer, the program including: a) a setting function setting one or more code sizes; b) a compressing function compressing an image that is divided into a plurality of image quality levels in accordance with the code sizes; and c) a generating function generating code being dividable into each code size.

According to the program in an embodiment of the present invention, the program may further include: d) an embedding function embedding the corresponding relation between the reference value and the code size into the generated code.

According to the program in an embodiment of the present invention, the program may be recorded to a recording medium.

Furthermore, one embodiment of the present invention includes a recordable media storing a program to be installed or executed by a computer, where the program includes: a) a dividing function dividing image data into a plurality of segments; b) a setting function setting a code size corresponding to each of the segments; c) a compressing function compressing the segments of the image data by adjusting the segments in accordance with the code size; and d) a generating function generating code by referring to the corresponding relation between the code size and the segment.

According to the program in an embodiment of the present invention, operation a) may further include a function of dividing the image data based on a tile, a precinct, or a code block.

According to the program in an embodiment of the present invention, the program may further include: e) an embedding function embedding the corresponding relation between the code size and the segment into the generated code.

According to the program in an embodiment of the present invention, the program may be recorded to a recording medium.

Furthermore, the present invention provides a program to be installed or executed by a computer, the program including: a) a decompressing function decompressing the code generated from the program in an embodiment of the present invention.

Furthermore, one embodiment of the present invention includes a recordable media storing a program to be installed or executed by a computer, where the program includes: a) a setting function setting one or more code sizes; b) a compressing function compressing an image that is divided into a plurality of image quality levels in accordance with the code sizes; c) a generating function generating code being dividable into each code size; and d) a decompressing function decompressing the code generated in operation c).

Furthermore, one embodiment of the present invention includes a recordable media storing a program to be installed or executed by a computer, where the program includes: a) a dividing function dividing image data into a plurality of segments; b) a setting function setting a code size corresponding to each of the segments; c) a compressing function compressing the segments of the image data by adjusting the segments in accordance with the code size; d) a generating function generating code by referring to the corresponding relation between the code size and the segment; and e) a decompressing function decompressing the generated code.

Other and more specific embodiments of the present invention include an image compression apparatus, an image compression method, a program, and a recording medium for conducting a transformation process in accordance with a targeted output medium at high speed without increasing the requirement for compression data storage capacity and without requiring much time in outputting thumbnail images.

Other and more specific embodiments of the present invention include an image decompression apparatus, an image decompression method, a program, and a recording medium for conducting high speed decompression of compressed image data generated from the compression technique of the present invention or decompression of compressed image data by using information generated from the compression technique of the present invention.

Other and more specific embodiments of the present invention include an image compression/decompression apparatus, an image compression/decompression method, a program, or a recording medium using the compression technique and the decompression technique of the present invention.

Other embodiments and further features of the present invention will become apparent from the following detailed description when read in conjunction with the accompanying drawings.

In the following, embodiments of the present invention are described with reference to the accompanying drawings.

Encoded data that are processed in the embodiment of the present invention explained below are encoded data (hereinafter also referred to as compressed data) of a still image of JPEG 2000 (ISO/IEC FCD 15444-1), and encoded data of a moving picture of Motion-JPEG 2000 (ISO/IEC FCD 15444-3). In Motion-JPEG 2000, the moving picture is realized by a series of continuous still images, each image serving as a frame, and the encoded data of each frame are based on JPEG 2000, with the only difference being the file format that differs from JPEG 2000 in part.

JPEG 2000 is an image compression/decompression method chosen as an international standard in 2001 as a successor of JPEG. Details of the algorithm of JPEG 2000 are available from published books, such as "Next-generation Image Coding System JPEG 2000" by Yasuyuki Nomizu (Triceps, Inc.).

FIG. 1 is a block diagram for illustrating an algorithm of hierarchical encoding/decoding with JPEG 2000, and is also a block diagram serving to explain an image compression (and/or decompression) apparatus according to an embodiment of the present invention.

The algorithm of JPEG 2000 is configured by a two-dimensional wavelet transform portion 2, a quantization portion 3, an entropy coding portion 4, and a tag processing portion 5. The two-dimensional wavelet transformation portion 2, the quantization portion 3, and the entropy coding portion 4 serve to process data that are input/output from/to a color space conversion portion (color conversion portion) 1 and also data input/output from/to the tag processing portion 5. The portions may be arranged in a reverse direction. Further, the process conducted by each of the portions may be performed on data of each component of a targeted image.

FIG. 2 is a simplified diagram showing a flow of the algorithm of JPEG 2000. In a compression process, each component of image data is subjected to color space conversion in step S2. Then, wavelet transformation is performed on each of the components to obtain wavelet coefficients (step S3). Then, the coefficients of the wavelets are subjected to progressive-sub-bit-plane encoding (quantization) (step S4) and then entropy encoding (step S5). On the other hand, in a decompression process, wavelet coefficients for each component obtained from entropy decoding (step S5) and inverse quantization (step S4) are subjected to inverse wavelet transformation (step S3) followed by inverse color conversion (step S2), to thereby return to the original RGB image as shown in step S1.

Next, the algorithm of JPEG 2000 is described in detail.

In comparison with the conventional JPEG algorithm, one of the most significant differences is the method of transformation. While a DCT (Discrete Cosine Transform) method is applied to the conventional JPEG, a DWT (Discrete Wavelet Transform) method is applied to the hierarchical coding algorithm of JPEG 2000. The DWT method, in comparison with the DCT method, is advantageous in that high quality images can be provided in areas compressed at high levels. This is one major reason for employing the DWT method in the JPEG 2000 algorithm that serves as a successor of the JPEG algorithm. As another significant difference, a functional block referred to as the "tag processing unit 5" is added for executing code formation at the final stage of the system. In the tag processing unit 5, compressed data are generated in the form of code stream data during an image compression process, and code stream data required to be decompressed are interpreted during a decompression process. By using the code stream data, JPEG 2000 is able to provide a variety of useful functions. Other than being able to provide satisfactory image quality under high compression rate (low bit rate), the algorithm of JPEG, 2000 has many other useful features.

One of the JPEG 2000 features is being able to adjust the amount of the encoded data without performing recompression by post-quantization by discarding (truncation) of codes of the encoded data. The code discarding (truncation) can be performed in various units, such as domains of tiles, precincts, components, decomposition levels (or resolution levels), bit planes, sub-bit planes, packets, and layers in the case of a multi-layer structure.

For example, FIG. 3 shows sub-bands in each decomposition level in a case of three decomposition levels. The process of compressing/decompressing still images can be stopped at a given level subjected to octave division in which an image is divided in a block basis by performing DWT as shown in FIG. 3. As for the relations between decomposition levels and resolution levels, the resolution level is 0 with respect to sub-band 3LL, the resolution level is 1 with respect to sub-bands 3HL, 3LH, 3HH, the resolution level is 2 with respect to sub-bands 2HL, 2LH, 2HH, and the resolution level is 3 with respect to sub-bands 1HL, 1LH, and 1HH. According to "JPEG 2000 Part 1, FDIS (Final Draft International Standard)," the term "decomposition level" is defined as follows:

"A collection of wavelet subbands where each coefficient has the same spatial impact or span with respect to the source component samples. These include the HL, LH and HH subbands of the same two-dimensional subband decomposition. For the last decomposition level the LL subband is also included."

Another JPEG 2000 feature is being able to restructure the layer of the encoded data under a code state, that is, the encoded data as they are. Another feature is being able to restructure the encoded data of a certain progression sequence to encoded data of another progression sequence under the code state. Further, another feature is being able to divide the encoded data of a multi-layer structure into two or more sets of encoded data in units of layers under the code state.

Next, the algorithm of JPEG 2000 is further described in detail step by step.

In many cases, the color-space transformation/inverse transformation unit 1 (as shown in FIG. 1) is connected to an input/output unit for an original image. The color-space transformation/inverse transformation unit 1 performs color-space transformation/inverse transformation, for example, transformation/inverse transformation from an RGB color expression system (comprising primary color components of Red (R), Green (G), and Blue (B)) or a YMC color expression system (comprising complementary color components of Yellow (Y), Magenta (M), and Cyan (C)) to a YUV or YCbCr color expression system.

Figure 4:
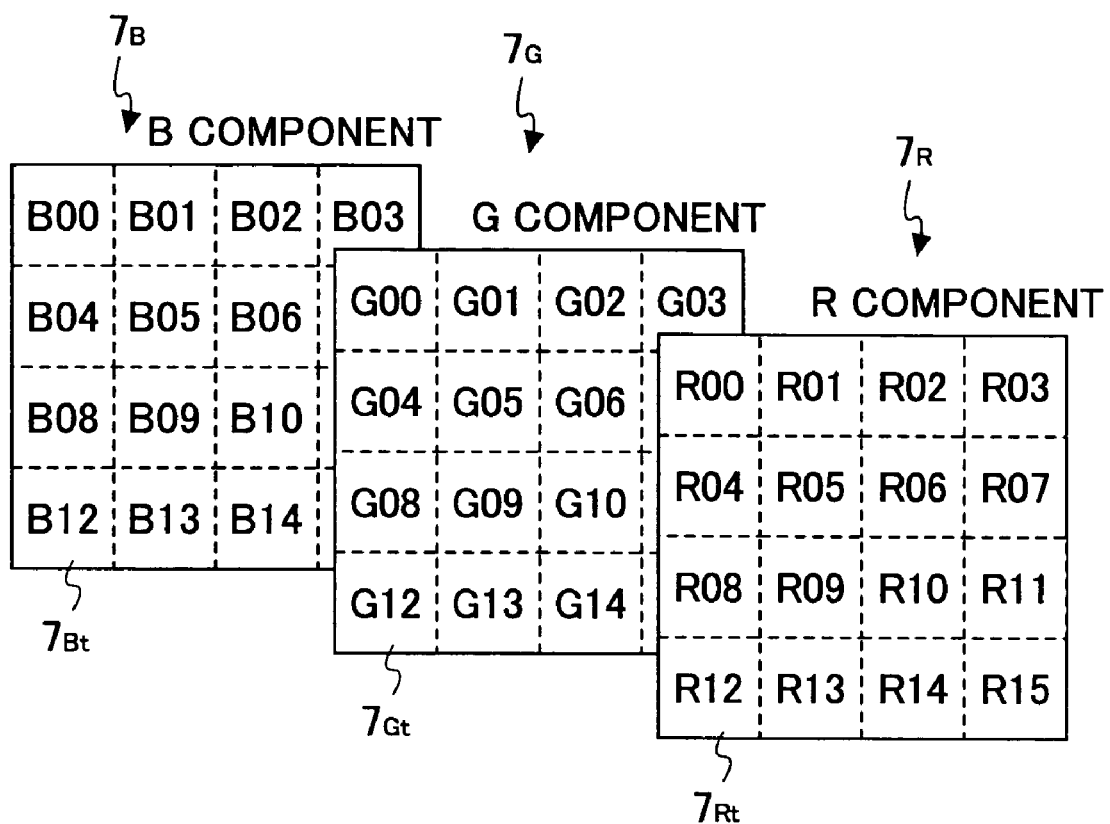
FIG. 4 is a set of schematic diagram showing an example of each component of a color image divided into tiles.

FIG. 4 is a diagram for illustrating an example of components of an original image divided into tiles.

Generally, with color images, components $7_R$, $7_G$, $7_B$ (in this embodiment, components of an RGB color expression system) of an original image are divided into respective rectangular domains (tiles) $7_{Rt}$, $7_{Gt}$, $7_{Bt}$ in a manner shown in FIG. 4. Each of the tiles (in the example shown in FIG. 4, R00, R01, ..., R15/G00, G01, ..., G15/B00, B01, ..., B15) serves as a basic unit on which an image data compression/decompression operation is conducted. Accordingly, components of image data (image data of each frame in a case of processing moving pictures) targeted for compression/decompression are divided into rectangular domains that are not overlapped (referred to as tiles) and are processed in tile units. That is, the image data compression/decompression operation is conducted independently for each component and each tile. However, it is also possible to allow the tile size to be the same as the size of the image. That is, it is also possible not to conduct such tile division.

In an image data encoding operation, image data of each tile of each component are input to the color-space conversion/inverse conversion unit 1 (see FIG. 1), at which color-space conversion is performed. Subsequent to the color-space conversion, the image data are subjected to two-dimensional wavelet transformation in the two-dimensional wavelet transformation/inverse transformation unit 2, and are spatially divided into frequency bands. It is to be noted that this color space conversion may be skipped.

FIG. 3 shows sub-bands in each decomposition level in a case where the number of decomposition levels is 3. That is, an original image tile (0 LL) (decomposition level 0 ($6_0$)) is decomposed by the two-dimensional wavelet transform, into sub-bands of decomposition level 1 ($6_1$), namely, 1LL, 1HL, 1LH, and 1HH. That is, the original image tile ($6_0$) is divided into the sub-bands shown on decomposition level 1 ($6_1$). Then, the low frequency sub-band 1LL on decomposition level 1 is subjected to two-dimensional wavelet transformation to be further decomposed into sub-bands, namely, 2LL, 2HL, 2LH, and 2HH on decomposition level 2 ($6_2$). Similarly, the low frequency sub-band 2LL is subjected to two-dimensional wavelet transformation to be further decomposed into sub-bands, namely, 3LL, 3HL, 3LH, and 3HH on decomposition level 3 ($6_3$). Here, taking all of the decomposition levels, the sub-bands targeted for encoding are sub-bands 3HL, 3LH, 3HH, 2HL, 2LH, 2HH, 1HL, 1LH, and 1HH, in a case of, for example, three decomposition levels. In this case, sub-band 3LL is not targeted for encoding.

Next, bits targeted for encoding are determined in a prescribed encoding sequence for allowing the quantization unit 3 (shown in FIG. 1) to generate a context from the bits surrounding the encoding targeted bits. That is, the coefficients of the wavelets obtained by recursive division (octave division) of a low frequency component (LL sub-band coefficient), as described above, are quantized for every sub-band in the quantization unit 3. In JPEG 2000, both "lossless" (reversible) compression and "lossy" (irreversible) compression are possible. If lossless compression is carried out, quantization step width is always set at 1, and the data are not quantized at this stage. The wavelet coefficients that have been quantized, for example, increase to 12 bits with respect to 8 bits in the original image.

After quantization, in the entropy encoding unit, the tiles of each component are encoded by probability estimation in accordance with context and encoding targeted bits. Thereby, entropy encoding of each sub-band coefficient is carried out. As for the entropy encoding, a coding system called EBCOT (Embedded Block Coding with Optimized Truncation) is used that includes block division, coefficient modeling, and binary arithmetic coding. A bit plane of each sub-band coefficient after quantization is encoded for every block (called "code block") from a higher rank plane to a lower rank plane.

In the tag processing unit 5, a code generating process is conducted. In the code generating process, the encoded data from the entropy encoding unit 4 are combined into a single code stream, and tag information is added thereto. In the tag processing unit 5, packets are generated by collecting codes of the code blocks generated in the entropy encoding unit 4. The generated packets are put in order according to a sequence of progression (progression sequence), and tag information is added, such that encoded data in a predetermined format are generated. As for the sequence control, the progression sequence of JPEG 2000 is defined by, for example, a resolution level, a precinct (position), a layer, and a component (color composition).

Next, the entropy encoding process in the entropy coding unit 4 and the code generating process in the tag processing unit 5 are described in detail.

Wavelet coefficients having undergone the quantization process are divided into non-overlapped rectangles referred to as "precincts" for each sub-band. This is introduced in order to efficiently use memory during an implementation process. Further, each precinct is divided into non-overlapped rectangular "code blocks."

Here, a brief explanation is presented about the precinct, the code block, the packet, and the layer. The following size relations exist: image>=tile>=sub-band>=precinct>=code bock.

Figure 9:
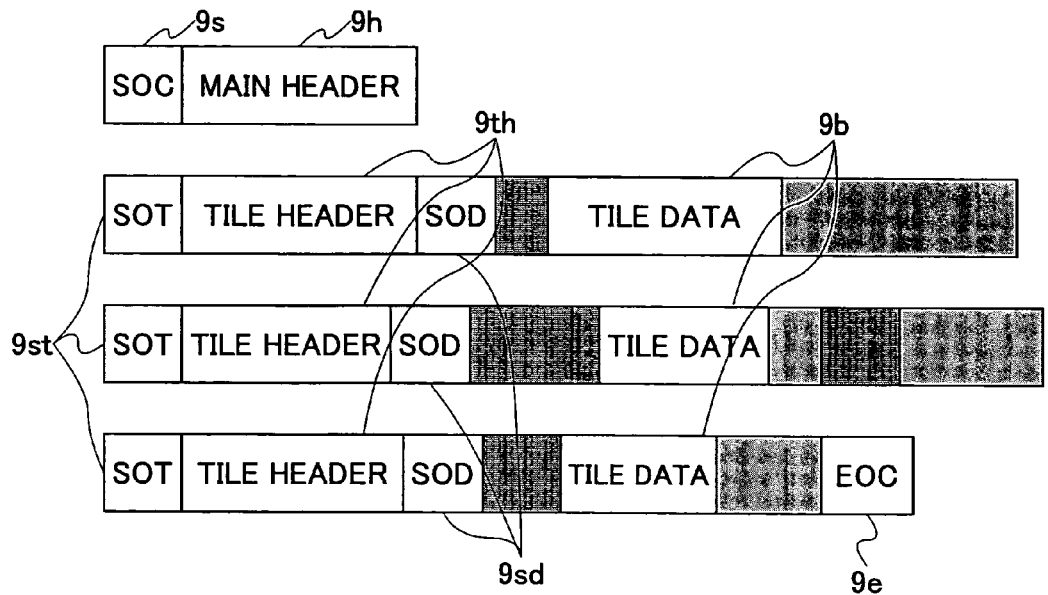
FIG. 9 is a data diagram showing a format of code data (code stream structure) of JPEG 2000 that is generated from a code generating process.

A precinct is one or more rectangular domains of sub-bands. A group of three domains of sub-bands HL, LH, and HH belonging to the same decomposition level and having the same relative spatial position, are treated as a precinct. In the case of the LL sub-band, however, one domain alone is treated as a precinct. Here, it is also possible to make the size of the precinct be the same size as the sub-band. Further, a rectangular domain that is a division of a precinct is a code block. The packet is a collection (assembly) of parts of codes (for example, the codes of three sheets of the bit planes, i.e., from MSB to the third bit) of all the code blocks of the precinct. An empty packet is also allowed. Packets are generated by collecting the codes of the code blocks, and are arranged in a desired progression sequence, such that encoded data are generated. With reference to FIG. 9, the portion that follows SOD of each tile header represents a set of the packets.

A layer is generated by collecting the packets of all the precincts (that is, all the code blocks, and all the sub-bands), the layer being a part of codes of the entire image region (for example, codes of the highest tier bit plane through codes of the third tier bit plane of the wavelet coefficients of the entire image region). However, it is not necessary that the layer include the packets of all the precincts, as described later. Accordingly, where there are a larger number of layers that are decoded at the time of decompression, a higher quality image can be reproduced. Accordingly, the layer serves as a unit for representing image quality. If all the layers are collected, the codes of all the bit planes of the entire image region are obtained.

Figure 5:
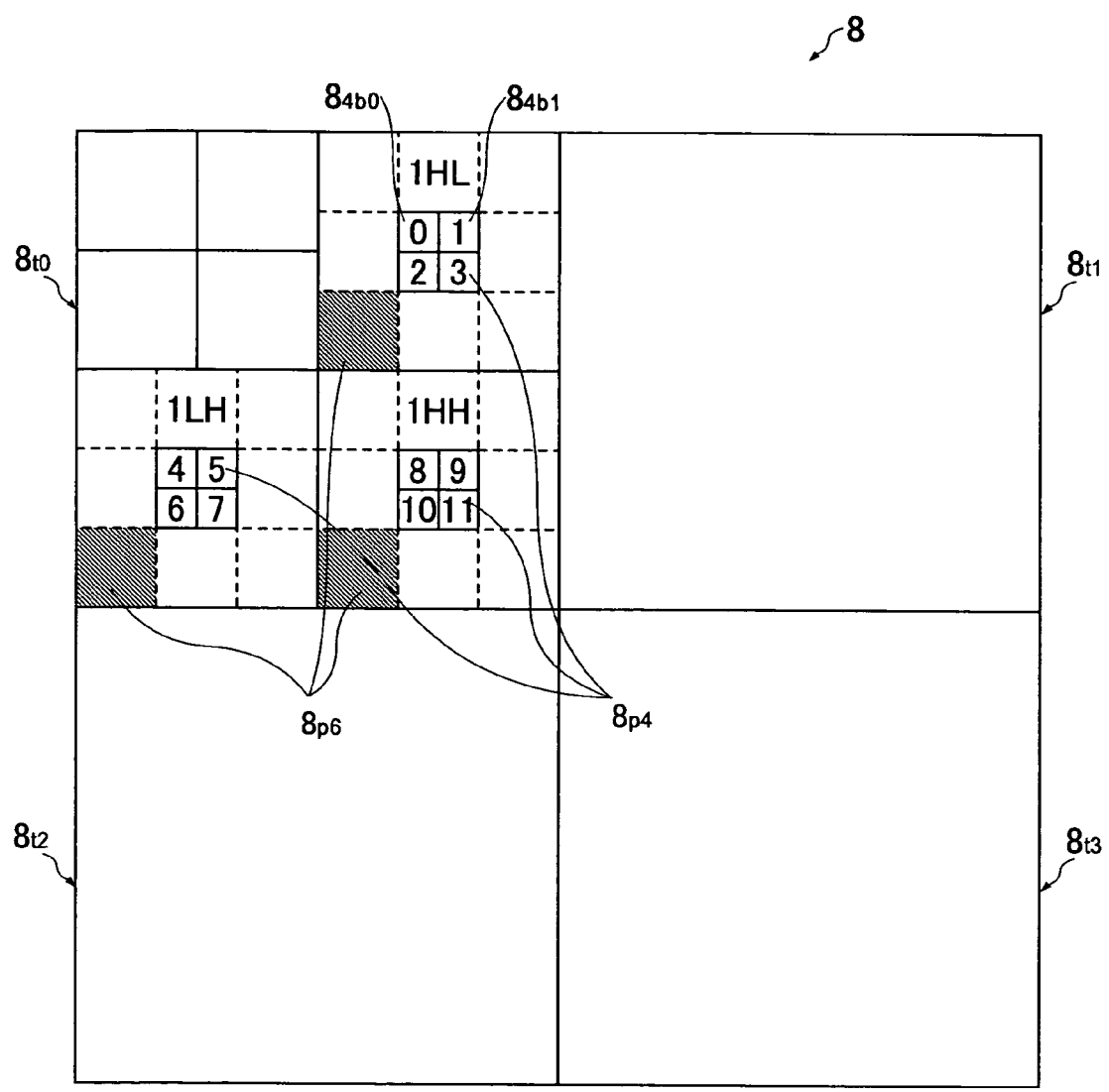
FIG. 5 is a schematic diagram showing a relation between precincts and code blocks.
Figure 8:
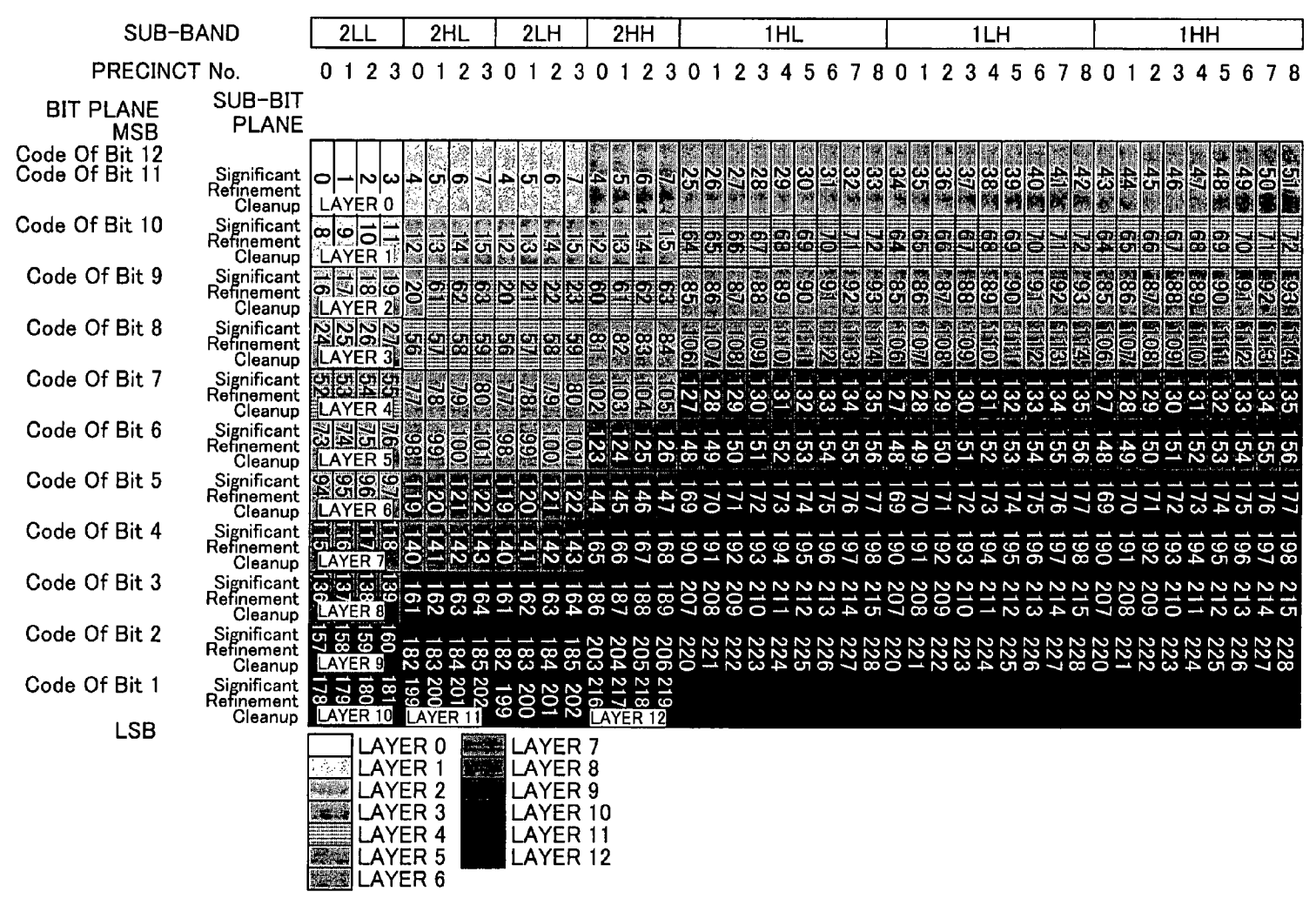

FIG. 5 is a diagram for illustrating the relation between precincts and code blocks. FIGS. 6 through 8 are tables showing an example of packets and layers in a case of decomposition level 2 (resolution level=3), in which FIG. 6 shows an example of a typical layer structure, FIG. 7 shows an example of a layer structure that allows thumbnails to be output to corresponding devices, and FIG. 8 shows an example of a layer structure that allows thumbnails to be output in accordance with the capacity of transmission lines.

The wavelet coefficients having gone through the process of quantization are divided into precincts for each sub-band. In FIG. 5, one precinct (for example, precinct $8_{p4}$) is formed of three rectangular domains having the same relative spatial position. Another such precinct is precinct $8_{p6}$). That is, a group of three domains having the same relative spatial position (indicated as precincts in FIG. 5) is treated as one precinct. Here, an original image 8 is divided into four tiles at decomposition level 1, namely, tiles $8_{t0}$, $8_{t1}$, $8_{t2}$, and $8_{t3}$. Further, each precinct is divided into non-overlapping rectangular code blocks (e.g. code blocks $8_{4b0}$, $8_{4b1}$, . . . in precinct $8_{p4}$). The code blocks serve as a basic unit during entropy encoding in the entropy encoding/decoding unit 4.

In order to enhance encoding efficiency, coefficients may be decomposed into units of bit planes that are arranged in sequence for each pixel or code block, to thereby allow a layer of one or more bit planes to be formed. That is, layers are structured according to the significance of the coefficients of the bit planes, and the encoding process is conducted for each of the layers. In one example, only the most significant layer (MSB) and few layers ranked lower than the MSB are subjected to encoding, and the other remaining layers including the lowest ranked layer (LSB) are truncated.

FIG. 6 shows an example of packets and layers (number of layers=10), where the decomposition level is set at 2 (resolution level=3). In FIG. 6, the small vertically elongated rectangles are packets, and the numbers indicated inside the packets are packet numbers. Layers are illustrated as horizontally elongated rectangular domains with different shades. That is, in this example, layer 0 includes the packets of the packet numbers 0 through 51, layer 1 includes the packets of the packet numbers 52 through 72, layer 2 includes the packets of the packet numbers 73 through 93, layer 3 includes the packets of the packet numbers 94 through 114, layer 4 includes the packets of the packet numbers 115 through 135, layer 5 includes the packets of the packet numbers 136 through 156, layer 6 includes the packets of the packet numbers 157 through 177, layer 7 includes the packets of the packet numbers 178 through 198, layer 8 includes the packets of the packet numbers 199 through 215, and layer 9 includes the packets of the remaining packet numbers 216 through 228. The relations between the packets and the precincts, etc., vary depending on the progression sequence, the number of divided layers, etc. Therefore, the layer structure as described above is merely one example.

FIG. 7 shows an example of a layer structure allowing thumbnails to be output according to a corresponding device. Although this example has a structure similar to that of the layer structure of FIG. 6, thumbnail information (packet numbers 2, 10, 18, 26, 54, 75) illustrated with a same shade is set as correspondence information, which is to be recorded in a recording medium or a header portion of compressed data, for providing a thumbnail display for a digital camera, for example. Thumbnail information for providing a thumbnail display for image viewing software may also be set (packet numbers 96, 117). Thumbnail information for providing a display for a mobile telephone may also be set (2LL). In one embodiment of the present invention, compressed image data are generated in accordance with the correspondence information.

FIG. 8 shows an example of a layer structure allowing thumbnails to be output according to the capacity of a transmission line. In this example, the number of layers is 13 and the decomposition level is set at 2 (resolution level=3). In this example, layer 0 includes the packets of the packet numbers 0 through 3 shown with the same shade; layer 1 includes the packets of the packet numbers 4 through 11 shown with the same shade; layer 2 includes the packets of the packet numbers 4 through 7 and packet numbers 12 through 19 shown with the same shade; layer 3 includes the packets of the packet numbers 12 through 15 and packet numbers 20 through 51 shown with the same shade; layer 4 includes the packets of the packet numbers 52 through 72 shown with the same shade; layer 5 includes the packets of the packet numbers 73 through 93 shown with the same shade; layer 6 includes the packets of the packet numbers 94 through 114 shown with the same shade; layer 7 includes the packets of the packet numbers 115 through 135 shown with the same shade; layer 8 includes the packets of the packet numbers 136 through 156 shown with the same shade; layer 9 includes the packets of the packet numbers 157 through 177 shown with the same shade; layer 10 includes the packets of the packet numbers 178 through 198; layer 11 includes the packets of the packet numbers 199 through 215 shown with the same shade; and layer 12 includes the packets of the packet numbers 216 through 228 shown with the same shade. The relations between the packets and the precincts, etc., vary depending on the progression sequence, the number of divided layers, etc. Therefore, the layer structure as described above is merely one example.

In each of the layer structures shown in FIGS. 6 through 8, encoded data are divided as packets being sequentially added, starting from a packet with a low packet number, until reaching a prescribed size. One layer is determined upon reaching the prescribed size. In the aforementioned layer structures, each bit plane is divided into sub-bit planes, namely, Refinement, Significant, and Cleanup. Nevertheless, more accurate control can be obtained by dividing the bit planes into more sub-bit planes. Furthermore, the priority in the sequence of the packets can be altered so that, for example, the packets may be arranged in a sequence where importance is placed on resolution, image quality, or position. The layer structures shown in FIGS. 6 through 8 correspond to the example described in Step S5 of FIG. 2.

FIG. 9 is a data diagram showing the format of the encoded data of JPEG 2000 generated in the code generating process (code stream structure). Various tag information is added to the encoded data. That is, the encoded data start with an SOC marker $9_s$ indicating the start of the code stream, followed by a main header (Main Header) $9_h$ describing a coding parameter, a quantization parameter, etc., and further followed by encoded data for every tile, as shown in FIG. 9. The encoded data for every tile starts with an SOT marker $9_{st}$, followed by a tile header (Tile Header) $9_{th}$, an SOD marker $9_{sd}$, and tile data (Tile Data; encoded data (bit stream $9_b$)). A tag that defines the end (EOC tag $9_e$) is placed at the end of the code stream (after the final tile data).

Figure 10:
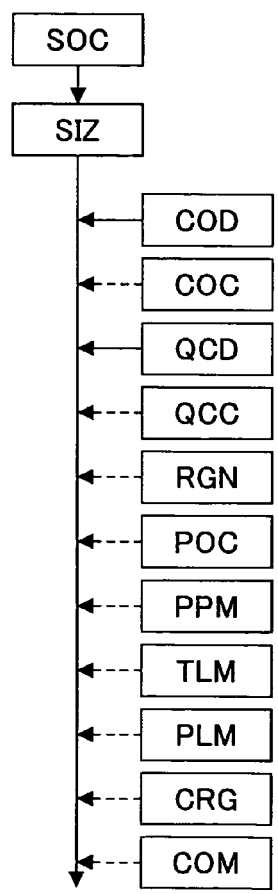
FIG. 10 is a data diagram showing a structure of the main header structure in FIG. 9.

FIG. 10 is a diagram showing the structure of the main header $9_h$ of FIG. 9.

As shown in FIG. 10, following the image and the tile size (SIZ), the main header 9h includes: coding style default (COD; requisite); a coding style component (COC); quantization default (QCD; requisite); quantization component (QCC); ROI (region of interest) (RGN); progression order change (POC); packed packet header (PPM); tile part length (TLM); packet length (PLM); color registration (CRG); and comment (COM). Other than SIZ and marker segments indicated as requisite (COD, QCD), other components are optional.

Figure 11:
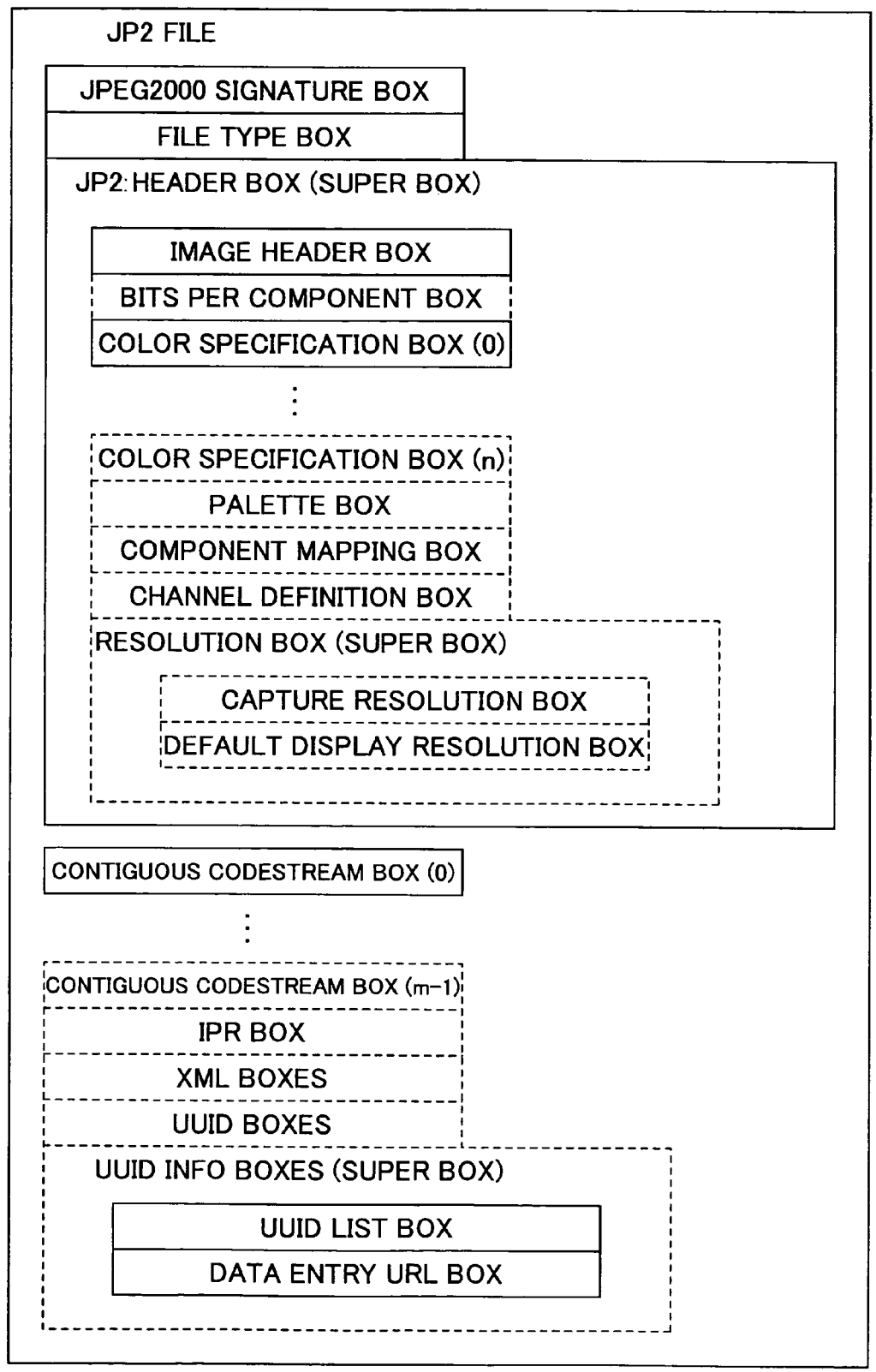
FIG. 11 is a schematic diagram showing a structure of a file format of a basic JPEG 2000 scheme.

FIG. 11 shows a structure of a file format of a JPEG 2000 scheme.

The file format of the JPEG 2000 scheme is referred to as the JP2 file format, and includes the JPEG 2000 coding format described in FIG. 9. The JP2 file format is a format aiming to include information such as image data, meta data, information indicating image property (e.g., gradation value, color space), and/or information on intellectual property rights. The information structure of the JP2 file, being formed by the JP2 file format, is composed of sectors of information (referred to as boxes), and includes information specialized for applications (referred to as meta data). As illustrated with solid lines (requisite) and broken lines (optional) in FIG. 11, the information structure of the JP2 file includes JPEG 2000 Signature box, File Type box, JP2 Header box, and a Contiguous Codestream box. The details thereof are illustrated in FIG. 11.

Meanwhile, in a decoding process, image data are generated from the codestream of each tile of each component. This process is described with reference to FIG. 1. The tag processing unit 5 interprets the tag information attached to the code stream input from the exterior, then the code stream is decomposed into code streams for each tile of each component, and then decoding (decompression) is performed for every code stream of each tile of each component. Along with determining the positions of bits that are targeted for decoding in accordance with the sequence based on the tag information in the code stream, the context is produced from the arrangement of peripheral bits (already decoded) in the quantization/inverse quantization unit 3. In the entropy encoding/decoding unit 4, decoding is performed by probability estimation according to the code stream and the contexts, to thereby reproduce the targeted bits. The targeted bits are disposed at the relevant pixel position. Accordingly, since the decoded data are spatially divided into respective frequency bands (sub-bands), each tile of each component of the image data is restored by performing a two-dimensional wavelet inverse transformation in the two-dimensional wavelet transverse/inverse transform unit 2. The obtained restored data are transformed into image data of the original color system by the color space transform/inverse transform unit 1.

Next, an embodiment according to the present invention is described in detail.

Figure 12:
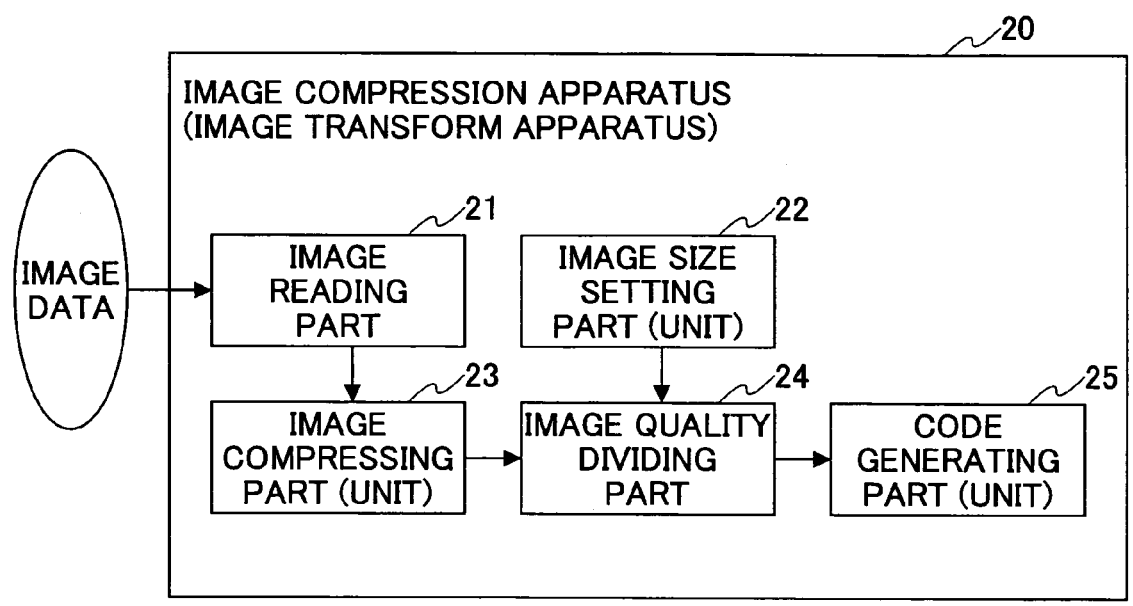
FIG. 12 is a block diagram for illustrating an example of a structure of an image compression apparatus according to an embodiment of the present invention.
Figure 13:
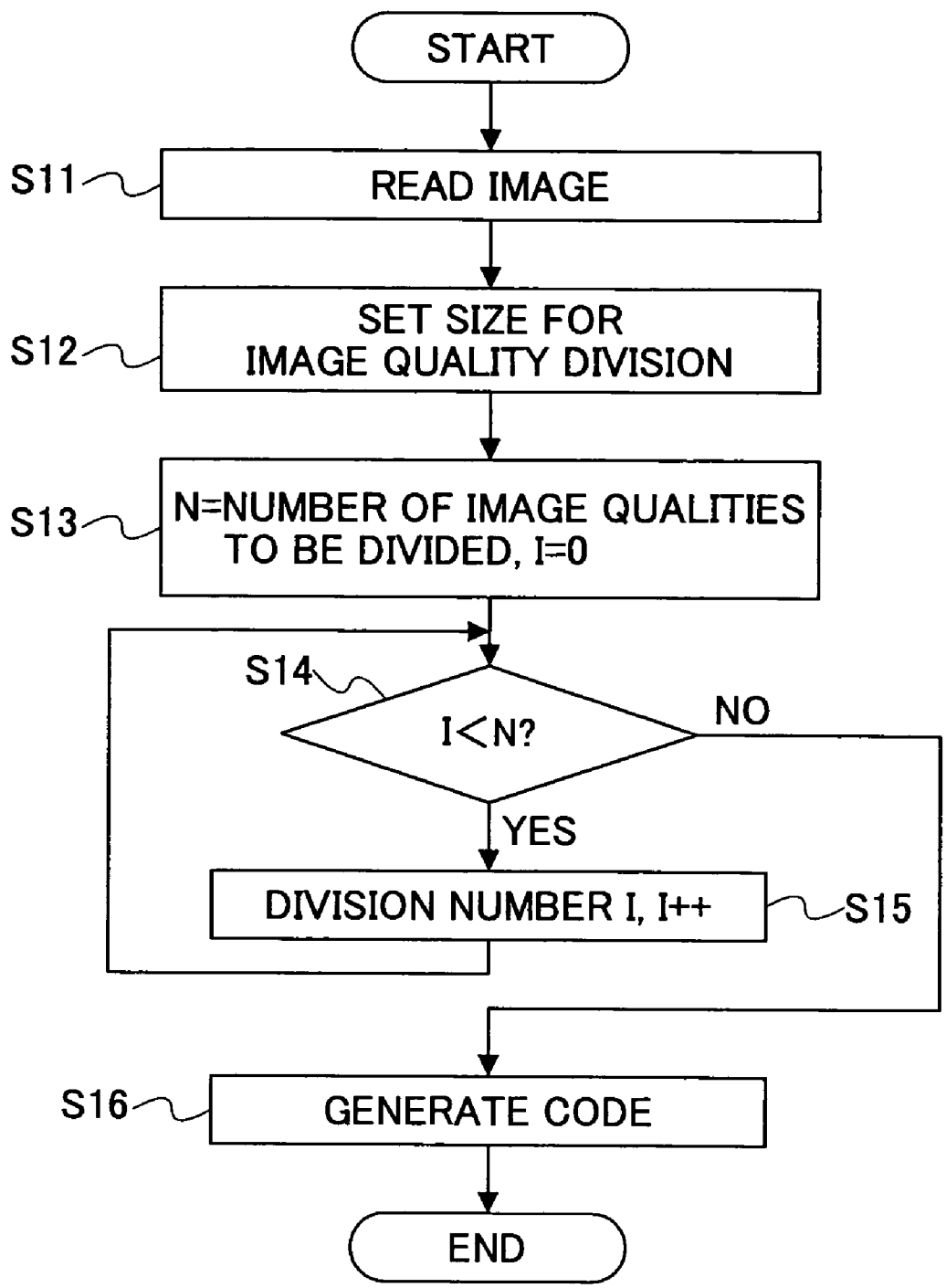
FIG. 13 is a flowchart for illustrating an image compression method (procedure) conducted in FIG. 12, and for illustrating an example of steps conducted with an image compression method according to an embodiment of the present invention.

FIG. 12 is a functional block diagram for illustrating an example of a structure of an image compression apparatus according to an embodiment of the present invention. FIG. 13 is a flow chart for illustrating an example of an image compression method according to an embodiment of the present invention and the exemplary image compression apparatus shown in FIG. 12.

The image compression apparatus according to an embodiment of the present invention is an apparatus that generates compressed image data, and includes a code size determining unit, a compressing unit, and a code generating unit. FIG. 12 shows an image compression apparatus 20 having: an image reading unit 21; an image size setting unit 22 that includes the code size setting unit; an image compressing unit 23 that includes the compressing unit; an image quality dividing unit 24; and a code generating unit 25 that includes the code generating unit.

The code size setting unit sets at least one code size (an example is described below). The compressing unit divides an image (may also be code data of a compressed image) into plural image quality levels and compresses the image according to the code size set by the code size setting unit. The code generating unit generates code that is easily dividable in accordance with each code size that has been set. Here, "easily dividable" implies that a point for allowing an image to be divided by a suitable size can be located easily during decompression of compressed image data. For example, an image can easily be divided in units of layers, wherein the layers are formed to allow easy display for a mobile phone (described below). For example, in structuring layers by the cutting of packets in a case where there is a predetermined size, a layer is formed so that the predetermined size can fit in layer 1. In a case where an image with a size of higher quality is desired to be cut out, another layer may be formed according to such desire.

With the image compressing apparatus 20, the image reading unit 21 (may also be referred to as "code reading unit") reads image data (may also be referred to as compressed data of a compressed image or un-compressed data; image file) (Step S11), and then, the image size setting unit 22 sets the size for dividing image quality (Step S12). The setting of the size may be conducted beforehand. Then, the number of parts for division is set (Step S13). Then, the image quality dividing unit 24 divides the image into plural image quality levels (Step S15) until the set number of parts are satisfied (until the relation in Step S14 becomes "NO"). Then, the image compressing unit 23 compresses the image, and then, the code generating unit 25 generates code that is easily dividable in accordance with each code size that has been set (Step S16).

Figure 14:
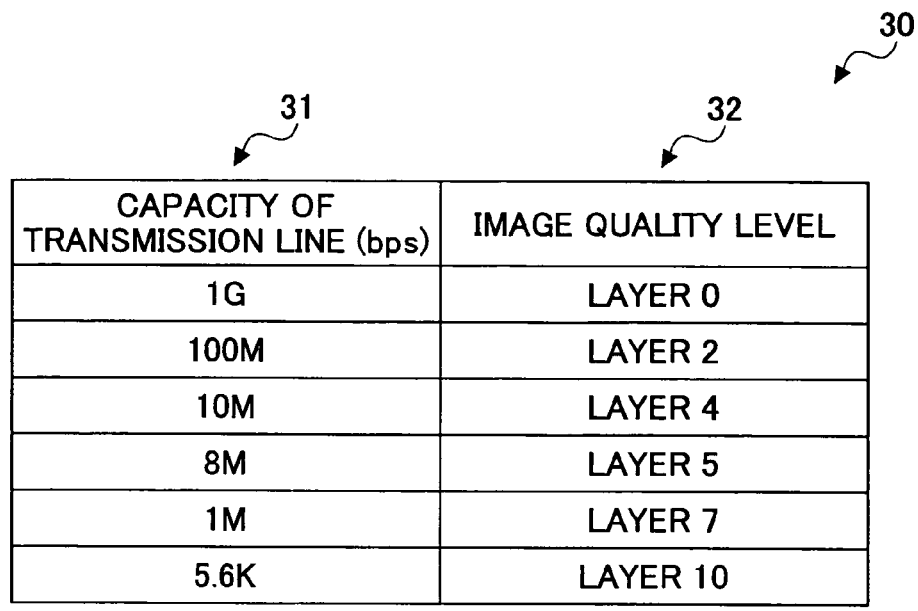
FIG. 14 is a table showing an example of a corresponding relation that is employed by the image compression apparatus of FIG. 12.

FIG. 14 shows an example of a correspondence relation used for the image compression apparatus shown in FIG. 12.

The image compression apparatus 20 has a correspondence relation stored therein. An example of a correspondence relation where image quality level is a layer is illustrated with a correspondence table 30 in FIG. 14. The correspondence table 30 is a table showing a correspondence relation between transmission line capacity (bps) 31 and image quality 32, wherein layer 10 (most significant layer) corresponds to a transmission line having a transmission line capacity of 5.6 K bps, layer 7 corresponds to a transmission line having a transmission line capacity of 1 M bps (layers 7 through 0 may, for example, be truncated; hereinafter the same), layer 5 corresponds to a transmission line having a transmission line capacity of 8 M bps, layer 4 corresponds to a transmission line having a transmission line capacity of 10 M bps, layer 2 corresponds to a transmission line having a transmission line capacity of 100 M bps, and layer 0 corresponds to a transmission line having a transmission line capacity of 1 G bps. Here, an acceptable required time may be set, and a targeted image quality may be set in accordance with respective speeds. Although the image quality level 32 shown in FIG. 14 is based on the examples of the layer structures of FIGS. 6 through 8; the layers are denoted in accordance with setting.

Before structuring of the layers, one packet is distributed to each precinct of each sub-band (for example, bit 1 through bit 12 that amounts to 12 bits). In one exemplary method for structuring the layers, layer 0 is formed by extracting packets only from portions of an image having the most significance until reaching a size that allows an image to be cut down to minimal size in a case where the transmission line capacity is 5.6 K bps. Next, in the same manner, layer 1 is formed by adding packets until reaching a size suitable for a transmission line having a transmission line capacity of 1 M bps. The following layers are also formed in the same manner.

An image compression apparatus according to another embodiment of the present invention may include an embedding unit that embeds a correspondence relation between set values and code sizes corresponding to each of the set values into the code. By allowing the code to retain the correspondence relation of code size and a corresponding set value, decompression can easily be conducted at high speed. The embedding unit may conduct storage or temporary storage before embedding the correspondence relation into the code. The embedding unit may embed a correspondence relation as thumbnail information into a header portion of compressed data read by the image reading unit 21 or code data divided by the image dividing unit 24.

As exemplary alternative locations for embedding thumbnail information (recording location), there are, for example, the COM markers in FIG. 10, the file format XML boxes in FIG. 11, the file format UUID boxes in FIG. 11, etc. An exemplary XML description is given below.

```
XML description
<?xml version="1.0" encoding="Shift-JIS"?>
<!DOCTYPE html
        PUBLIC "-//W3C//DTD XHTML 1.0 Strict//EN"
        "http://www.w3.org/TR/xhtml1/DTD/xhtml1-strict.dtd">
<html xmlns="http://www.w3.org/1999/xhtml" xml:lang="ja" lang="ja">
    <head>
        <title>THUMBNAIL</title>
    </head>
    <body>
        <p> 3 LL </p>
    </body>
</html>
```

In the image compression apparatus according to the embodiments of the present invention shown in FIGS. 12 through 14, a correspondence relation between image quality and code size is obtained by dividing an image into plural image quality levels. However, in an image compression according to another embodiment of the present invention, a rectangular domain may be used instead of image quality. Here, code data of a compressed image are divided into plural rectangular domains. Here, the image quality dividing portion 24 includes a dividing unit that divides image data (may also be code data of a compressed image) into plural rectangular domains, and the image size setting unit 22 includes a size setting unit that sets code size (code amount) corresponding to each rectangular domain. A compression unit regulates and compresses each of the rectangular domains to the set code size. Further, in accordance with the obtained correspondence relation between the domains and the code sizes, code is generated (and further, embedding into the code is conducted). As a result, an image can be compressed in accordance with code amount (code size) being set in correspondence to respective domains. A dividing unit that is able to divide code data based on tiles, precincts, or code blocks may be provided. That is, the domain on which the division is conducted may be a tile, a precinct, or a code block.

Further, in an image compression according to another embodiment of the present invention, a color component may be used instead of a rectangular domain. Here, code data of a compressed image are divided into plural color components. Here, the image quality dividing portion 24 includes a dividing unit that divides image data (may also be code data of a compressed image) into plural color components, and the image size setting unit 22 includes a size setting unit that sets code size (code amount) corresponding to each color component. A compression unit regulates and compresses each of the color components to the set code size. Further, in accordance with the obtained correspondence relation between the color components and the code sizes, code is generated (and further, embedding into the code is conducted). As a result, an image can be compressed in accordance with code amount (code size) being set in correspondence to respective color components.

Further, in an image compression according to another embodiment of the present invention, a resolution level (resolution) may be used instead of a rectangular domain. Here, code data of a compressed image are divided into plural resolutions. Here, the image quality dividing portion 24 includes a dividing unit that divides image data (may also be code data of a compressed image) into plural resolutions, and the image size setting unit 22 includes a size setting unit that sets code size (code amount) corresponding to each resolution. A compression unit regulates and compresses the data of each of the resolutions to the set code size. Further, in accordance with the obtained correspondence relation between the resolutions and the code sizes, code is generated (and further, embedding into the code is conducted). As a result, an image can be compressed in accordance with code amount (code size) being set in correspondence to respective resolutions.

Further, in an image compression according to another embodiment of the present invention, a packet may be used instead of a rectangular domain. Here, code data of a compressed image are divided into plural packets. Here, the image quality dividing portion 24 includes a dividing unit that divides image data (may also be code data of a compressed image) into plural packets, and the image size setting unit 22 includes a size setting unit that sets code size (code amount) corresponding to each packet. A compression unit regulates and compresses each of the packets to the set code size. Further, in accordance with the obtained correspondence relation between the packets and the code sizes, code is generated (and further, embedding into the code is conducted). As a result, an image can be compressed in accordance with code amount (code size) being set in correspondence to corresponding packets.

Next, a code size (at least one code size) that is set by a code size setting unit is described.

The code setting unit 22 includes a setting unit that sets a type of transmission line at least of one kind, and a size setting unit that sets a code size (may also be an image size) in accordance with the type of transmission line that has been set. The compression unit compresses an image by dividing image data into plural image quality levels according to a set code size. Then, the code generating unit generates code that is easily dividable in accordance with each code size that has been set by the code size setting unit. The code size set by the code size setting unit may be based on the type of transmission line, for example, "Ethernet (trademark) (100 M bps)," "Ethernet (trademark) (1 G bps)," "Ethernet (trademark) (10 M bps)," "Optical Cable (1.1 G bps)," "ADSL (8 M bps)," and/or "Dial-up line (5.6 K bps)."

Instead of setting the code size based on the type of transmission line, the code size may be set based on the capacity of a transmission line, for example, "100 M bps (Ethernet (trademark))," "1 G bps (Ethernet (trademark))," "10 M bps (Ethernet (trademark))," "1.1 G bps (Optical Cable)," "8 M bps (ADSL)," and/or "5.6 K bps (Dial-up line)."

Instead of setting the code size based on the type of transmission line, the code, size may be set based on the type of image display apparatus, for example, a mobile phone, a CRT, and/or a printer.

Instead of setting the code size based on the type of transmission line, the code size may be set based on display resolution (display resolution of an image display apparatus), for example, VGA, XVGA, and/or QCIF.

Instead of setting the code size based on the type of transmission line, the code size may be set based on the processing speed of an image display apparatus, for example, in a CPU with a clock of 500 MHz, 1 GHz, and/or 2 GHz.

In the above-given description, a process of generating code according to a correspondence relation (it is to be noted that a truncation process may be conducted during the code generation) or a process of embedding a correspondence relation into code is conducted with the image compression apparatus according to the embodiments of the present invention. Next, an image decompression apparatus employed with the aforementioned image compression apparatus according to the embodiments of the present invention is described.

The image decompression apparatus decompresses compressed data generated by the image compression apparatus. The image decompression may, for example, include a decompression unit that decompresses code or information generated by the image compression apparatus in accordance with a correspondence relation between a set value and a code size corresponding to the set value. It is to be noted that one embodiment of the present invention may also be provided as an image compression/decompression apparatus that includes the aforementioned image compression apparatus and the decompression unit.

Next, an exemplary output result of decompressing a compressed image with an image decompression apparatus (image compression/decompression apparatus) according to the embodiments of the present invention is described.

Figure 15:
FIG. 15 shows an example of an original image.

FIG. 15 shows an example of an original image 40, and FIGS. 16A through 16D shows the results of compressing the original image 40 in FIG. 15 with the image compression apparatus according to an embodiment of the present invention and outputting the image with the image decompression apparatus according to an embodiment of the present invention.

Figure 16A:
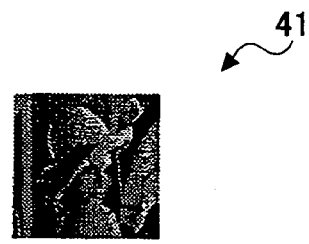
FIGS. 16A through 16D show resultant images processed by an image compression apparatus and output from an image decompression apparatus according to an embodiment of the present invention.
Figure 16B:
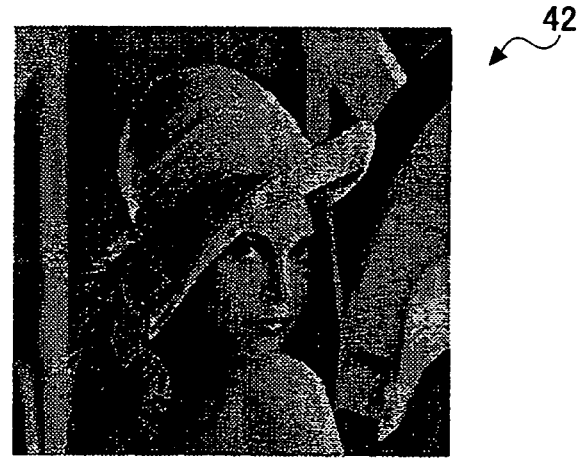
Figure 16C:
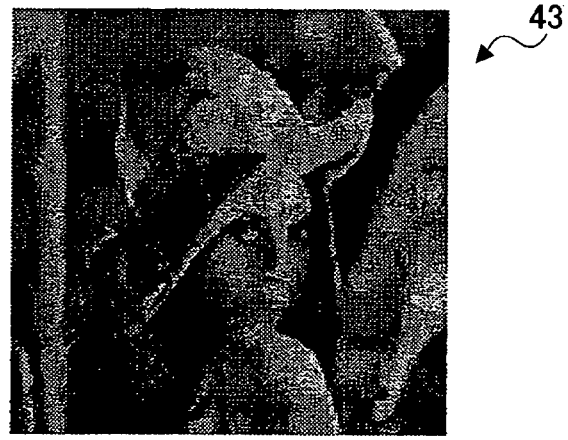
Figure 16D:
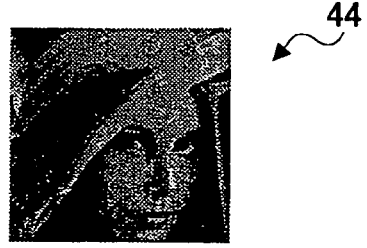

In a case of designating a low-resolution image of the original image 40 in accordance with the correspondence relation, an image 41 as shown in FIG. 16A is output. Similarly, in a case of designating a single component in accordance with the correspondence relation, an image 42 as shown in FIG. 16B is output; in a case of designating only layer 0 in accordance with the correspondence relation, an image 43 as shown in FIG. 16C is output; and in a case of designating tiles of a center portion in accordance with the correspondence relation, an image 44 as shown in FIG. 16D is output.

In consequence, the image compression apparatus according to the embodiments of the present invention generates compressed image data that allow thumbnails of an image to be quickly output without requiring a large space for storing compressed image data. Accordingly, a process of transforming an image into a form that is suited for a given output device can be conducted at high speed. Further, the point for dividing an image to a suitable size can be easily located with the image data compressed by the image compression apparatus. For example, a correspondence relation may be recorded in the header information of the compressed data or to a recording medium in an image processing apparatus. Accordingly, an image transmission system, for example, transmits compressed data having a dividing point that is easy to locate, compressed image data having a correspondence relation embedded in a header portion thereof, or correspondence relation and compressed data separately.

Furthermore, the image decompression apparatus (image compression/decompression apparatus) according to one embodiment of the present invention is able to quickly decompress compressed image data generated by the aforementioned compression technique. The image decompression apparatus according to another embodiment of the present invention is able to quickly decompress compressed image data based on information generated by the aforementioned compression technique.

Although description of the embodiments of the present invention is given above mainly in the form of an image compression apparatus, an image decompression apparatus, and an image compression/decompression apparatus, one embodiment of the present invention may be provided in the form of an image compression method, an image decompression method, or an image compression/decompression method that includes the processes conducted by the foregoing apparatuses as shown with the steps in FIG. 13. Further, one embodiment of the present invention may be provided in the form of a program enabling a computer to function as the foregoing apparatuses or to execute the foregoing methods (a program having the foregoing processes installed therein). Further, one embodiment of the present invention may be provided in the form of a computer-readable recording medium having the aforementioned program recorded thereto (a computer-readable recording medium having the aforementioned processes recorded thereto). Furthermore, one embodiment of the present invention may also be provided in the form of a system that provides the same advantages of the foregoing apparatuses such as generating compressed image data that allow thumbnails of an image to be quickly output without requiring a large space for storing compressed image data. The aforementioned program and recording medium can be easily executed by following the description of the aforementioned embodiments and the description given below.

An example of a program and a recording medium having the program stored therein for providing an image compression function and/or an image decompression function according to one embodiment of the present invention is next described. As examples of the recording medium, there are a CD-ROM, a magnetic optical disk, a DVD-ROM, a flexible disk, a flash memory, and other various kinds of ROM and RAM. At least one of the functions of image compression and image decompression can easily be achieved by providing such a recording medium that has a program enabling a computer to perform the aforementioned functions of one embodiment of the present invention recorded thereto. The function of one embodiment of the present invention can be executed, for example, in the form of mounting the recording medium to an information processing apparatus (e.g. computer or an apparatus of the like), reading out the program by starting up the program or by transmitting the program to another apparatus, or in the form of storing the program in a storage medium of the information processing apparatus and reading out the program when necessary.

Here, an example of a structure of an apparatus applicable for the foregoing embodiment is described.

Figure 17:
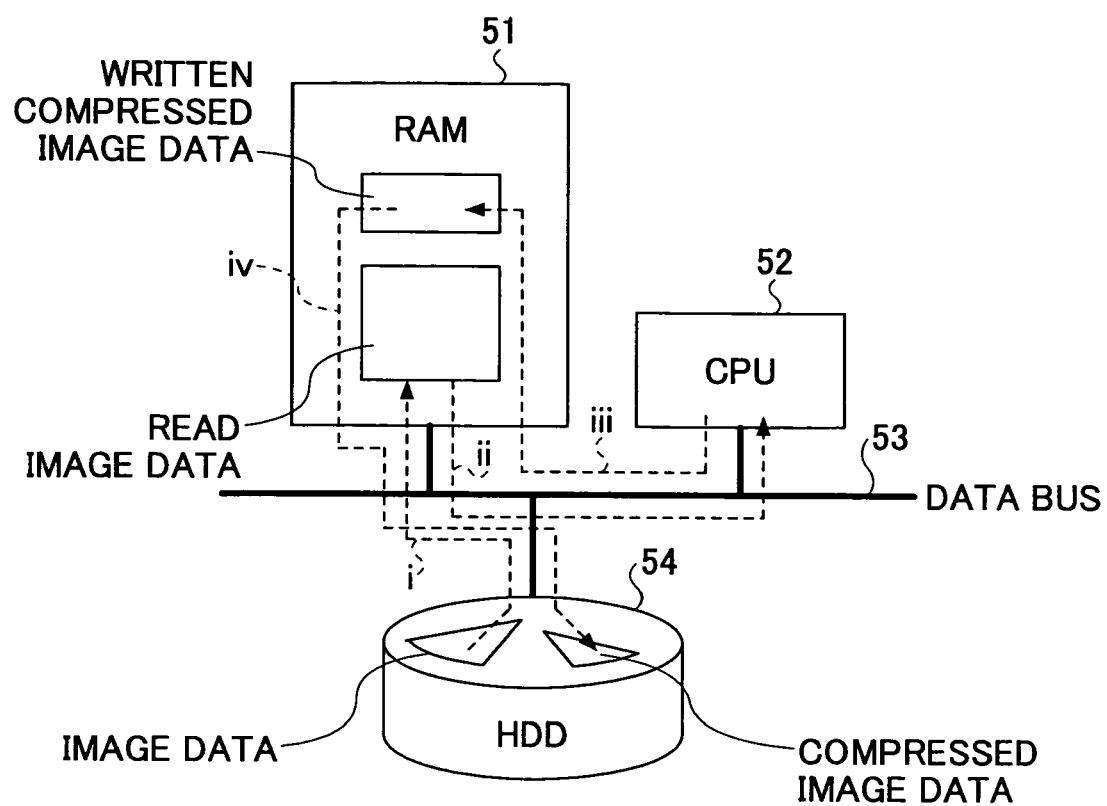
FIG. 17 is a block diagram showing an example of a structure of an image compression apparatus and/or image decompression apparatus according to an embodiment of the present invention.

FIG. 17 is an example showing a structure of an image compression apparatus and/or an image decompression apparatus according to one embodiment of the present invention.

This example of the image compression apparatus according to one embodiment of the present invention includes a RAM 51, a CPU 52, and an HDD 54 that are connected with a data bus 53. According to the flow described below, compressed data that are easily dividable are generated from the image data (may also be compressed data) of an original image and are stored in the HDD 54. It is to be noted that, the original image data are generated from the compressed data in the opposite order and are stored in the HDD 54 in a case of the image decompression apparatus according to one embodiment of the present invention, so further details in the case of the image decompression apparatus are omitted.

In the flow of the image compression apparatus according to one embodiment of the present invention, first, image data (or compressed image data) of the original image stored in the HDD 54 are read into the RAM 51 in compliance to a command from the CPU 52 (i). Then, the CPU 52 reads the image data in the RAM 51, obtains wavelet coefficients, and generates compressed image data by applying the processes of one embodiment of the present invention including, for example, code generation (ii). Then, the CPU 52 writes the generated compressed image data to another area in the RAM 51 (iii). Then, the compressed image data are recorded onto the HDD 54 according to commands from the CPU 52 (iv). Meanwhile, from the aspect of the image decompression apparatus, for example, a thumbnail can be output based on thumbnail information recorded in a header portion of the compressed image data when outputting the compressed image data for display, printing, or transmittal. The example of the image compression apparatus shown in FIG. 17 may also serve as an image decompression apparatus.

Hence, with one embodiment of the present invention, compressed image data can be generated so that thumbnails of an image can be quickly output without requiring large space for storing compressed image data. Accordingly, a process of transforming an image into a form that is suited for a given output device can be conducted at high speed.

Furthermore, with one embodiment of the present invention, compressed image data generated by the aforementioned compression technique can be quickly decompressed, or compressed image data based on information generated by the aforementioned compression technique can be quickly decompressed.

Further, the present invention is not limited to these embodiments, but various variations and modifications may be made without departing from the scope of the present invention.

The present application is based on Japanese Priority Application No.2003-037972 filed on Feb. 17, 2003, with the Japanese Patent Office, the entire contents of which are hereby incorporated by reference.

What is claimed is:

1. An image compression apparatus for generating compressed code data of an image, the image compression apparatus comprising:
   a setting unit to set a number of parts by which the image is to be divided;
   a dividing unit to divide the image until the image is divided into a plurality of image parts that satisfy the dividing number set by the setting unit; and
   a compressing unit to generate compressed code data by compressing the image parts divided by the dividing unit;
   wherein the dividing number set by the setting unit corresponds to a transmission line capacity and an image quality level.

2. The image compression apparatus as claimed in claim 1, wherein the dividing number set by the setting unit further corresponds to a color component.

3. The image compression apparatus as claimed in claim 1, wherein the compressing unit uses compression complying with a JPEG 2000 standard.

4. An image compression apparatus for generating compressed code data of an image, the image compression apparatus comprising:

a setting unit to set a number of parts by which the image is to be divided;

a dividing unit to divide the image until the image is divided into a plurality of image parts that satisfy the dividing number set by the setting unit; and a compressing unit to generate compressed code data by compressing the image parts divided by the dividing unit, wherein the dividing number set by the setting unit corresponds to a transmission line capacity and a color component.

5. An image compression apparatus for generating compressed code data of an image, the image compression apparatus comprising:

a setting unit to set a number of parts by which the image is to be divided; a dividing unit to divide the image until the image is divided into a plurality of image parts that satisfy the dividing number set by the setting unit; and a compressing unit to generate compressed code data by compressing the image parts divided by the dividing unit, wherein the dividing number set by the setting unit corresponds to a transmission line capacity and a resolution level.

6. A method for generating compressed code data of an image, the method comprising:

setting a number of parts by which the image is to be divided;

dividing the image until the image is divided into a plurality of image parts that satisfy the dividing number; and generating compressed code data by compressing the divided image parts;

wherein the dividing number corresponds to a transmission line capacity and an image quality level.

7. The method defined in claim 6, wherein the dividing number further corresponds to a resolution level.

8. A method for generating compressed code data of an image, the method comprising:

setting a number of parts by which the image is to be divided;

dividing the image until the image is divided into a plurality of image parts that satisfy the dividing number; and generating compressed code data by compressing the divided image parts, wherein the dividing number corresponds to a transmission line capacity and a color component.

9. The method defined in claim 8, wherein generating compressed code data comprises performing compression complying with a JPEG 2000 standard.

10. A method for generating compressed code data of an image. the method comprising:

setting a number of parts by which the image is to be divided;

dividing the image until the image is divided into a plurality of image parts that satisfy the dividing number; and generating compressed code data by compressing the divided image parts, wherein the dividing number corresponds to a transmission line capacity and a resolution level.

11. An article of manufacture having one or more computer-readable storage media storing executable instructions thereon which, when executed by a system, cause the system to perform an image compression method for generating compressed code data of an image, the method comprising:

setting the number of parts for dividing the image;

dividing the image until the image is divided into a plurality of image parts that satisfy the dividing number; and generating compressed code data by compressing the divided image parts, wherein the dividing number corresponds to a transmission line capacity and an image quality level.

12. An article of manufacture having one or more computer-readable storage media storing executable instructions thereon which, when executed by a system, cause the system to perform an image compression method for generating compressed code data of an image, the method comprising:

setting the number of parts for dividing the image;

dividing the image until the image is divided into a plurality of image parts that satisfy the dividing number; and generating compressed code data by compressing the divided image parts, wherein the dividing number corresponds to a transmission line capacity and a color component.

13. The article of manufacture defined in claim 12, wherein the dividing number set further corresponds to a resolution level.

14. An article of manufacture having one or more computer-readable storage media storing executable instructions thereon which, when executed by a system, cause the system to perform an image compression method for generating compressed code data of an image, the method comprising:

setting the number of parts for dividing the image;

dividing the image until the image is divided into a plurality of image parts that satisfy the dividing number; and generating compressed code data by compressing the divided image parts, wherein the dividing number set corresponds to a transmission line capacity and a resolution level.

15. The article of manufacture defined in claim 14, wherein generating compressed code data comprises performing compression complying with a JPEG 2000 standard.

* * * * *